US008662721B2

(12) United States Patent
Calvin et al.

(10) Patent No.: US 8,662,721 B2
(45) Date of Patent: Mar. 4, 2014

(54) AIRCRAFT EXTERNAL LIGHTING SYSTEM AND METHOD

(76) Inventors: Nathan Howard Calvin, Boise, ID (US); Dean Andrew Wilkinson, Boise, ID (US)

( * ) Notice: Subject to any disclaimer, the term of this patent is extended or adjusted under 35 U.S.C. 154(b) by 457 days.

(21) Appl. No.: 12/626,615

(22) Filed: Nov. 26, 2009

(65) Prior Publication Data

US 2011/0122635 A1    May 26, 2011

(51) Int. Cl.
*B64D 47/02* (2006.01)

(52) U.S. Cl.
USPC ............ 362/470; 362/331; 362/332; 362/333

(58) Field of Classification Search
USPC .......................................... 362/470, 330–338
See application file for complete search history.

(56) References Cited

U.S. PATENT DOCUMENTS

| | | | |
|---|---|---|---|
| 1,430,580 A | 10/1922 | Old | |
| 3,255,343 A | 6/1966 | Kloss | |
| 4,158,222 A | 6/1979 | Cook | |
| 4,755,804 A | 7/1988 | Levati et al. | |
| 4,929,866 A | 5/1990 | Murata | |
| 4,964,025 A | 10/1990 | Smith | |
| 5,289,298 A | 2/1994 | Smith | |
| 5,379,132 A * | 1/1995 | Kuwayama et al. | ............ 359/13 |
| 5,495,227 A | 2/1996 | Wreede et al. | |
| 5,528,474 A | 6/1996 | Roney et al. | |
| 6,045,240 A | 4/2000 | Hochstein | |
| 6,318,886 B1 | 11/2001 | Stopa et al. | |
| 6,328,456 B1 | 12/2001 | Mise | |
| 6,439,752 B1 | 8/2002 | Petrick | |
| 6,461,029 B2 | 10/2002 | Gronemeier et al. | |
| 6,481,130 B1 | 11/2002 | Wu | |
| 6,507,290 B1 | 1/2003 | Lodhie et al. | |
| 6,507,441 B1 | 1/2003 | Eisenberg et al. | |
| 6,525,668 B1 | 2/2003 | Petrick | |
| 6,641,284 B2 | 11/2003 | Stopa et al. | |
| 6,644,841 B2 | 11/2003 | Martineau | |
| 6,851,835 B2 | 2/2005 | Smith et al. | |
| 6,948,830 B1 | 9/2005 | Petrick | |
| 6,994,459 B2 | 2/2006 | Worsdell et al. | |
| 7,008,079 B2 | 3/2006 | Smith | |
| 7,021,801 B2 | 4/2006 | Mohacsi | |
| 7,055,994 B2 | 6/2006 | Martin | |
| 7,236,105 B2 | 6/2007 | Brenner et al. | |
| 7,245,203 B2 | 7/2007 | Stephens et al. | |
| 7,314,296 B2 | 1/2008 | Machi et al. | |
| 7,434,970 B2 | 10/2008 | Machi et al. | |
| D592,780 S | 5/2009 | Calvin et al. | |
| 2005/0093718 A1 | 5/2005 | Martin | |

OTHER PUBLICATIONS

Goodrich Aircraft Lighting Product Data Sheet for 747B Anti-Collision Light (Catalog), Oct. 2006 Goodrich Hella Aerospace Lighting Systems Inc. 129 Fairfield Street Oldsmar, FL 34677.

* cited by examiner

*Primary Examiner* — Sean Gramling
(74) *Attorney, Agent, or Firm* — Gerard Carlson

(57) ABSTRACT

An aircraft external lighting system and method is applicable to aircraft position, navigation and strobe lights. The lighting system includes a light source, a cylindrical lens adjacent the light source, and a lenticular lens between the light source and the cylindrical lens.

17 Claims, 14 Drawing Sheets

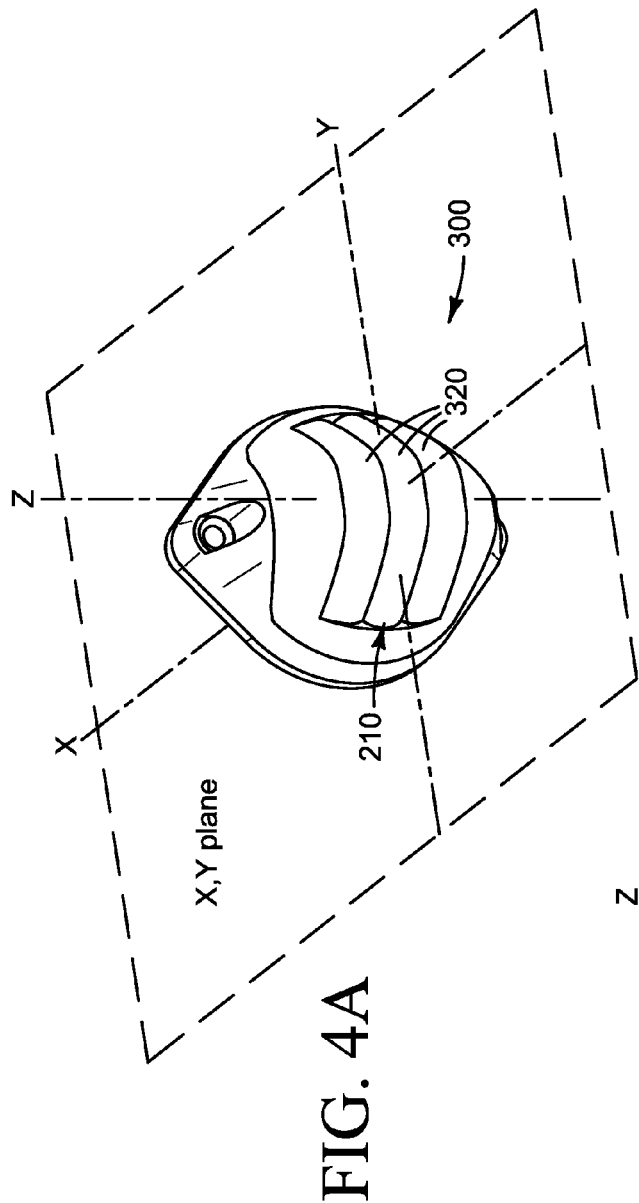
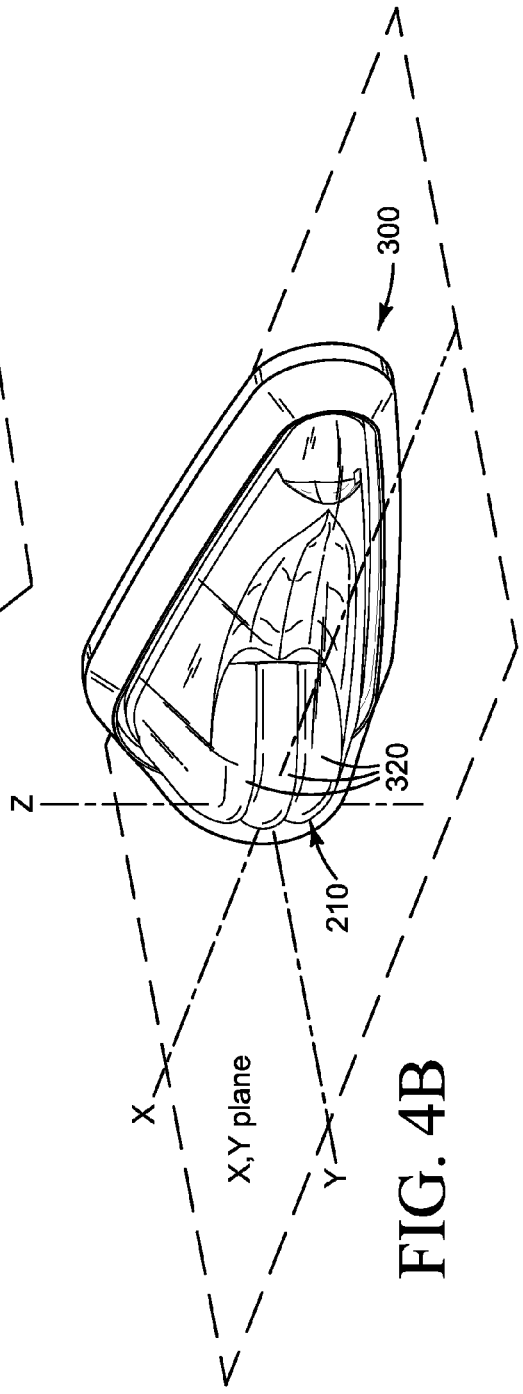
FIG. 4A
FIG. 4B

AIRCRAFT EXTERNAL LIGHTING SYSTEM AND METHOD

CROSS REFERENCE TO RELATED APPLICATIONS

Not applicable.

FEDERALLY SPONSORED RESEARCH OR DEVELOPMENT

Not applicable.

JOINT RESEARCH AGREEMENT

Not applicable

SEQUENCE LISTING

Not applicable

FIELD OF THE INVENTION

The present invention relates to the field of warning lighting and in particular to aircraft navigation, position, and strobe lights.

BACKGROUND OF THE INVENTION

External aircraft lights, broadly speaking, fall into two main categories. The first is to act as warning lights for the purpose of providing a visible warning of the aircraft's presence to observers both on the ground and in other aircraft. The second is for the purpose of illuminating the space around the aircraft to improve visibility for the pilot, of which landing lights are an example. Essentially, there are three types of external aircraft warning lights: strobe lights, position lights and colored navigation lights. Strobe lights are intended to attract the attention of observers, especially in low light conditions and, accordingly, these lights are designed to emit very bright light all around the aircraft and are usually pulsed so that they flash at between about 40 to 100 times a minute. In addition to the necessity of emitting light all around the aircraft, regulations imposed by the relevant national governing aviation bodies stipulate that there should be a low divergence in the vertical plane. Accordingly, warning lights ideally emit light in a substantially horizontal disk pattern.

Once an observer is made aware of the presence of an aircraft by its warning lights, the colored navigation lights provide an indication of the orientation of the aircraft. Typically, an aircraft carries a green colored navigation light on the starboard side and a red colored navigation light on the port side. These colored lights are in addition to the white position lights and white strobe lights. Warning lights are typically located on the end of the wings and on the tail of an airplane. The colored navigation lights and position lights are less bright than the strobe lights and are generally illuminated continuously in use.

In contrast with the strobe lights which are required to be visible around 360 degrees in a horizontal plane, both the horizontal and vertical distribution of emitted light from position and navigation lights is important. This is because each type of warning light is required to emit light in a horizontal plane around the aircraft and at a minimum intensity which varies according to angular direction. For example, the red and green lights are not only required to emit bright light directly forward from the aircraft, but are also required to emit light to the port side and the starboard side respectively, albeit of a lower minimum intensity than in the forward direction. The white position lights are required to be visible from the rear of the aircraft and also to the port and starboard sides.

SUMMARY

Complex national aviation standards spell out the requirements for aircraft external lighting. The aircraft external lighting system and method economically meets these complex requirements. Embodiments of the aircraft external lighting system and method that enables the lighting system to aim light where it is desired while reducing wasted light in undesired directions. Also reduced is the problem where certain desired directions receive "too much" light. Earlier strobe lights directed excessive light in the direction of the pilot during hazy or cloudy flying conditions. In some situations this created elements of vertigo and disorientation for the pilot. While not necessarily a violation of specifications, it further implies that the additional energy is wasted. Wasted light may also imply lower reliability and shorter life due to the increased heat generated by the individual light sources.

In one embodiment an aircraft external lighting system has a light source, a cylindrical lens adjacent the light source, and a lenticular lens between the light source and the cylindrical lens. The light source may be multiple LEDs arranged individually or in planar arrays. One common type of LED emits light in a substantially lambertian radiation pattern.

Other embodiments employ multiple cylindrical lenses oriented parallel to the horizontal plane, also called the major plane of the aircraft. The lenticular lens is oriented substantially orthogonal to the cylindrical lens. Each cylindrical lens may be aligned in front of a portion of the plurality of LEDs.

Still other embodiments form the lenticular lens or lenses and the cylindrical lens or lenses on the same piece of material. The lenticular lens can be on one face of the material while the cylindrical lens can by on an opposing face. The light then passes through the material from one lens to another.

Yet other embodiments use reflectors to reflect light emitted from undesired directions into the lenticular lens or the cylindrical lens where the light is guided via total internal reflection to be emitted in a desired direction.

The aircraft external lighting system employs a method for directing the light by dispersing the light emitted from a light source, spreading the light in a first axis to obtain a more uniform pattern and then focusing the light along a second axis substantially orthogonal to the first axis in a number of desired directions. Some embodiments of the method use LEDs for emitting the light in a substantially lambertian radiation pattern. Other methods include reflecting light from directions not desired and redirecting the light in one or more of the desired directions using internal reflection in the lens.

The embodiments in the following figures show an aircraft external lighting system with a number of LEDs, multiple cylindrical lenses adjacent to and aligned with the LEDs, each cylindrical lens directing the light from the LEDs in a desired direction, a lenticular lens between the light source and the cylindrical lenses, the lenticular lens oriented substantially orthogonal to the cylindrical lenses. The two lens types are formed on opposing sides or faces of the same material. Reflectors reflect the light emitted in undesired directions redirecting the light into the lenticular lens or the cylindrical lenses where the light is guided via total internal reflection.

BRIEF DESCRIPTION OF DRAWINGS

The summary above and the following detailed description will be better understood in view of the enclosed drawings which depict details of preferred embodiments. Like reference numbers designate like elements. It should however be noted that the invention is not limited to the precise arrangement shown in the drawings. The features, functions and advantages can be achieved independently in various embodiments of the claimed invention or may be combined in yet other embodiments.

5C is a sectional view of one embodiment of the aircraft external lighting system.

Figure 6:
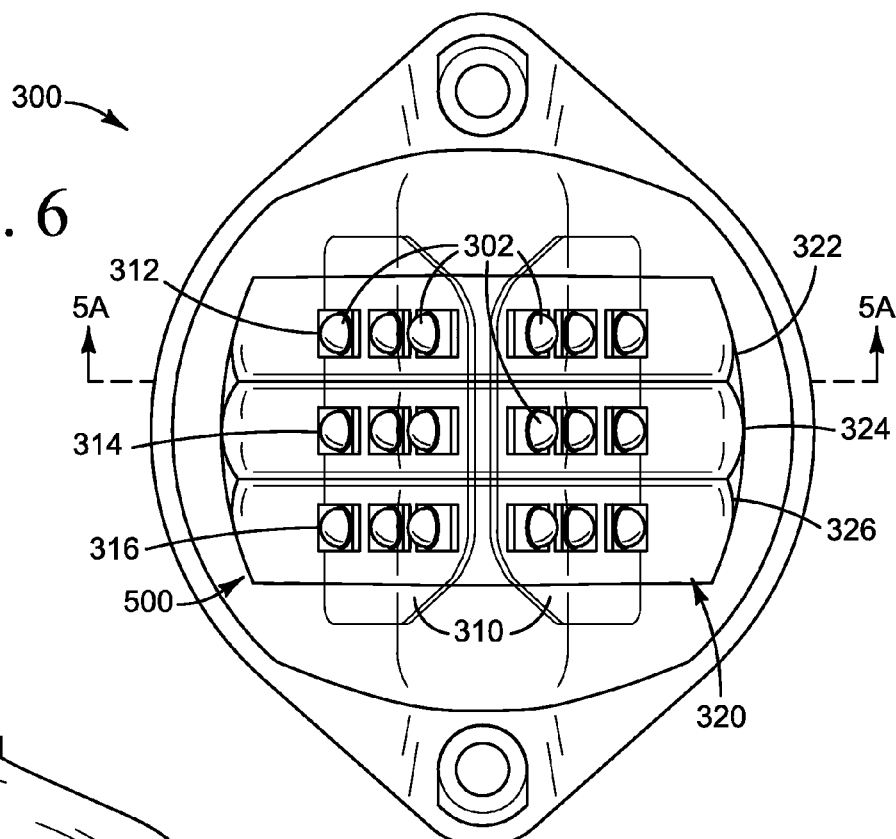

FIG. 6 is a frontal view of one embodiment of the aircraft external lighting system.

Figure 7:
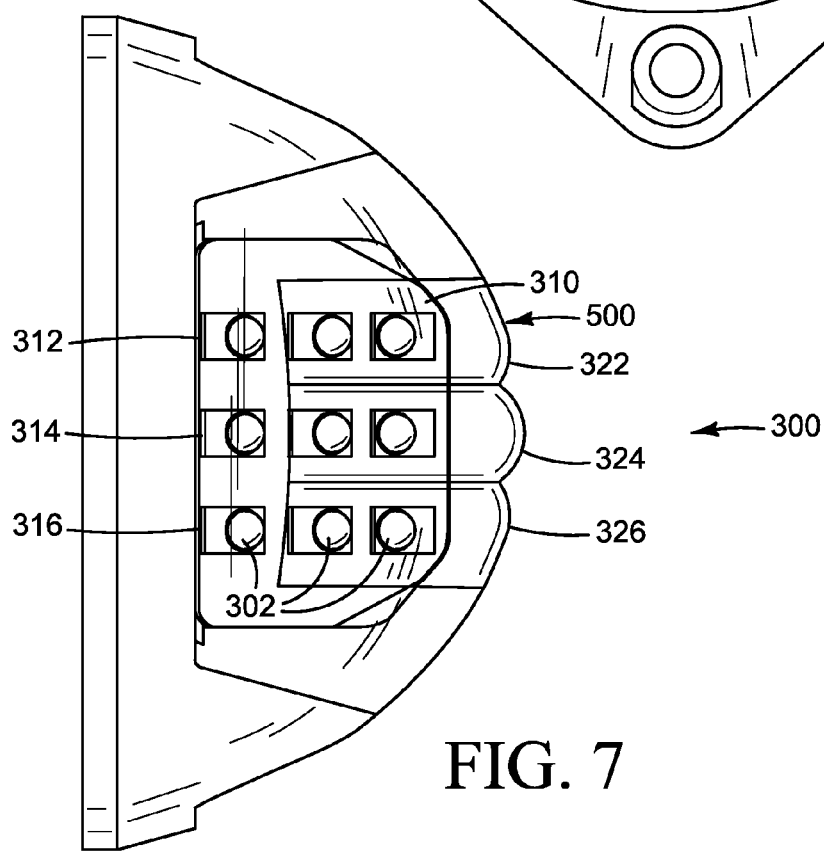

FIG. 7 is a side view of one embodiment of the aircraft external lighting system.

Figure 8:
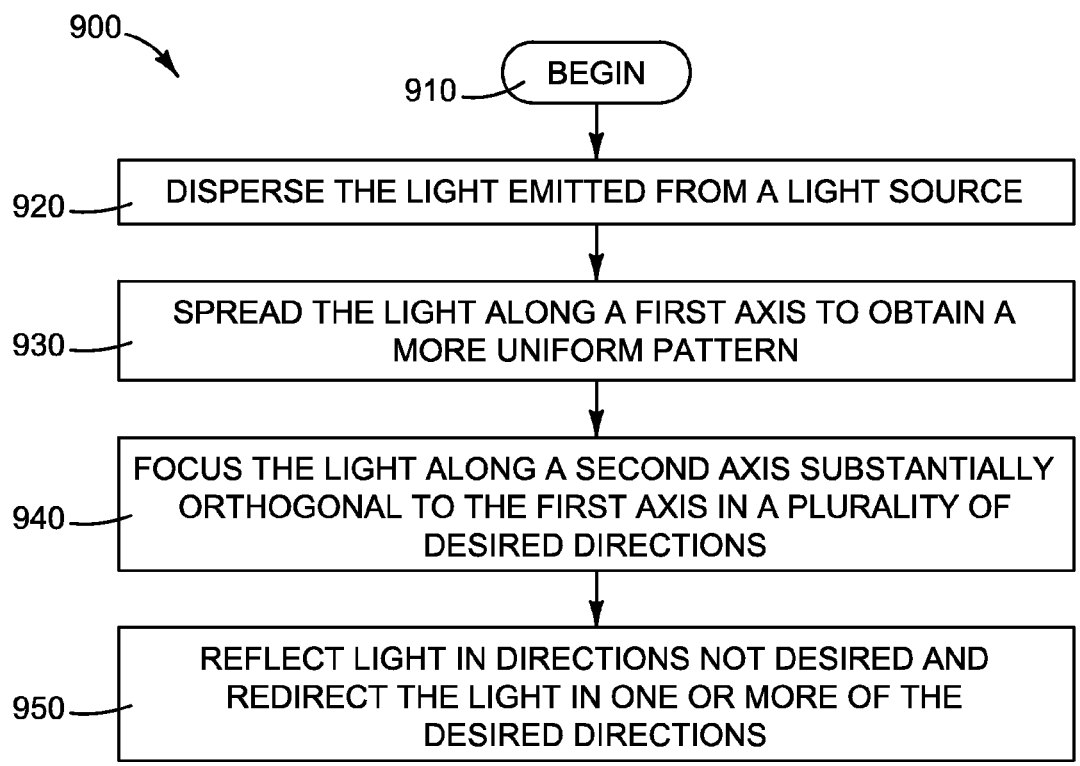

FIG. 8 is a flow chart of one embodiment of the aircraft external lighting method.

DETAILED DESCRIPTION

In the following description, reference is made to the accompanying drawings that form a part thereof, and in which is shown by way of illustration specific exemplary embodiments in which the invention may be practiced. These embodiments are described in sufficient detail to enable those skilled in the art to practice the invention, and it is to be understood that modification to the various disclosed embodiments may be made and other embodiments may be utilized, without departing from the spirit and scope of the present invention. The following detailed description is therefore, not to be taken in a limiting sense.

FIGS. 1A-1H show some of the requirements for aircraft external lighting systems. The aircraft external lighting system and method economically meets these complex requirements. Embodiments of the aircraft external lighting system have a unique lens system and method that enables the lighting system to aim light where it is needed, in desired directions, while reducing wasted light in unneeded, undesired directions. Also reduced is the problem where certain desired directions receive "too much" light. While not necessarily a violation of specifications, it implies that the additional energy is wasted. Wasted light may also imply lower reliability and shorter life due to the increased heat generated by the individual light sources.

Figure 1A:
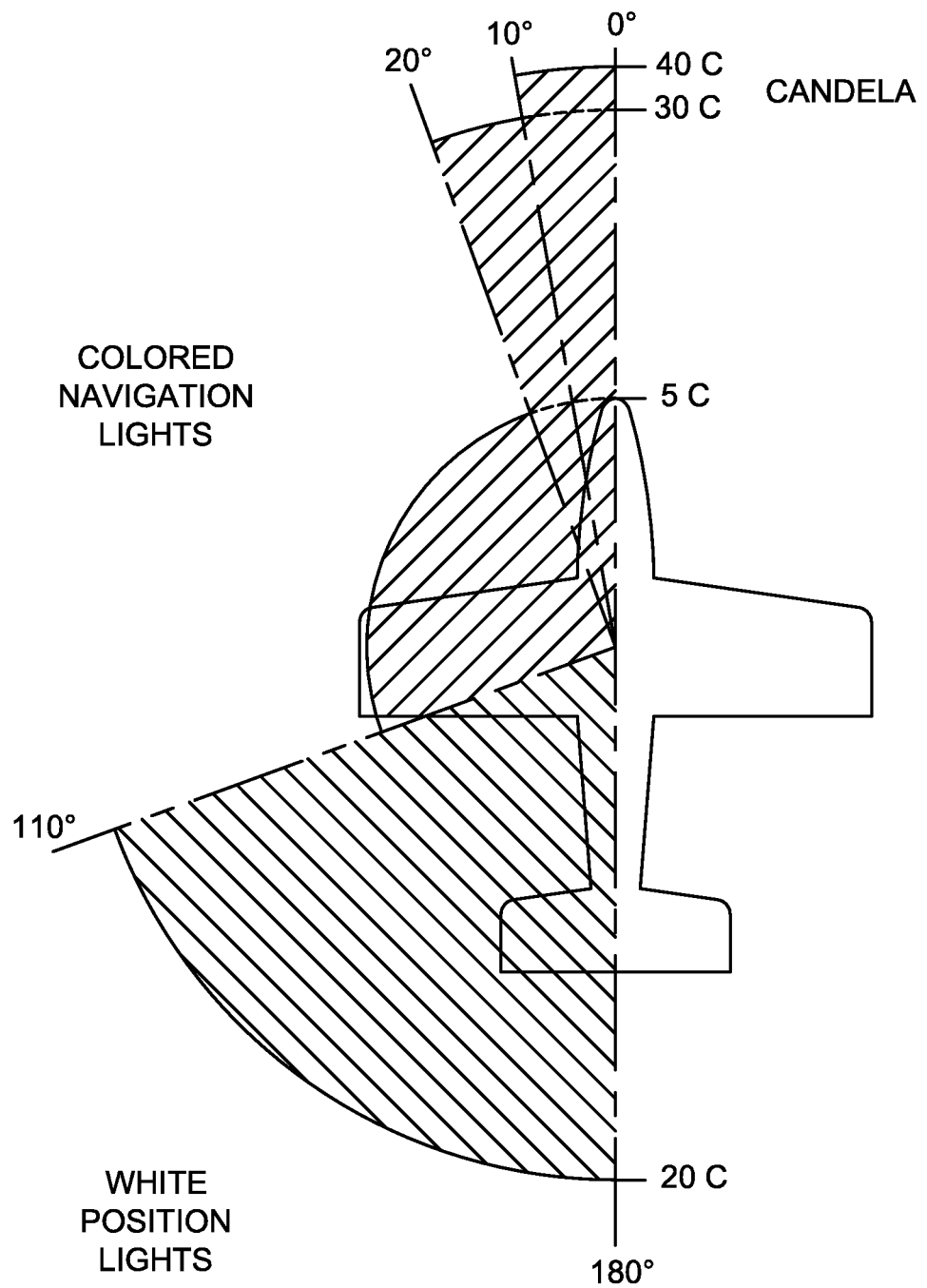
FIG. 1A is a pictorial summary of the light pattern required for colored navigation and white position lights relative to the aircraft.

FIG. 1A shows a pictorial summary of the light pattern required for colored navigation and white position lights relative to the aircraft. The major axis of the aircraft runs from 0 degrees to 180 degrees, nose to tail. The pattern of FIG. 1A is in the horizontal plane. The colored navigation lights must be visible from 0 degrees to 110 degrees. The luminous intensity of the colored navigation lights are a minimum of 40 candela from 0 to 10 degrees, 30 candela from 10 to 20 degrees, and 5 candela from 20 to 110 degrees. The luminous intensity of the white position lights is 20 candela from 110 to 180 degrees. FIG. 1A shows the requirements for the left or port side of the aircraft. The requirements for the right or starboard side of the aircraft are the same and have been omitted for clarity. The color of the port side navigation lights is aviation red, while the color of the starboard side navigation lights is aviation green. The exact color is defined by national aviation authorities.

Figure 1B:
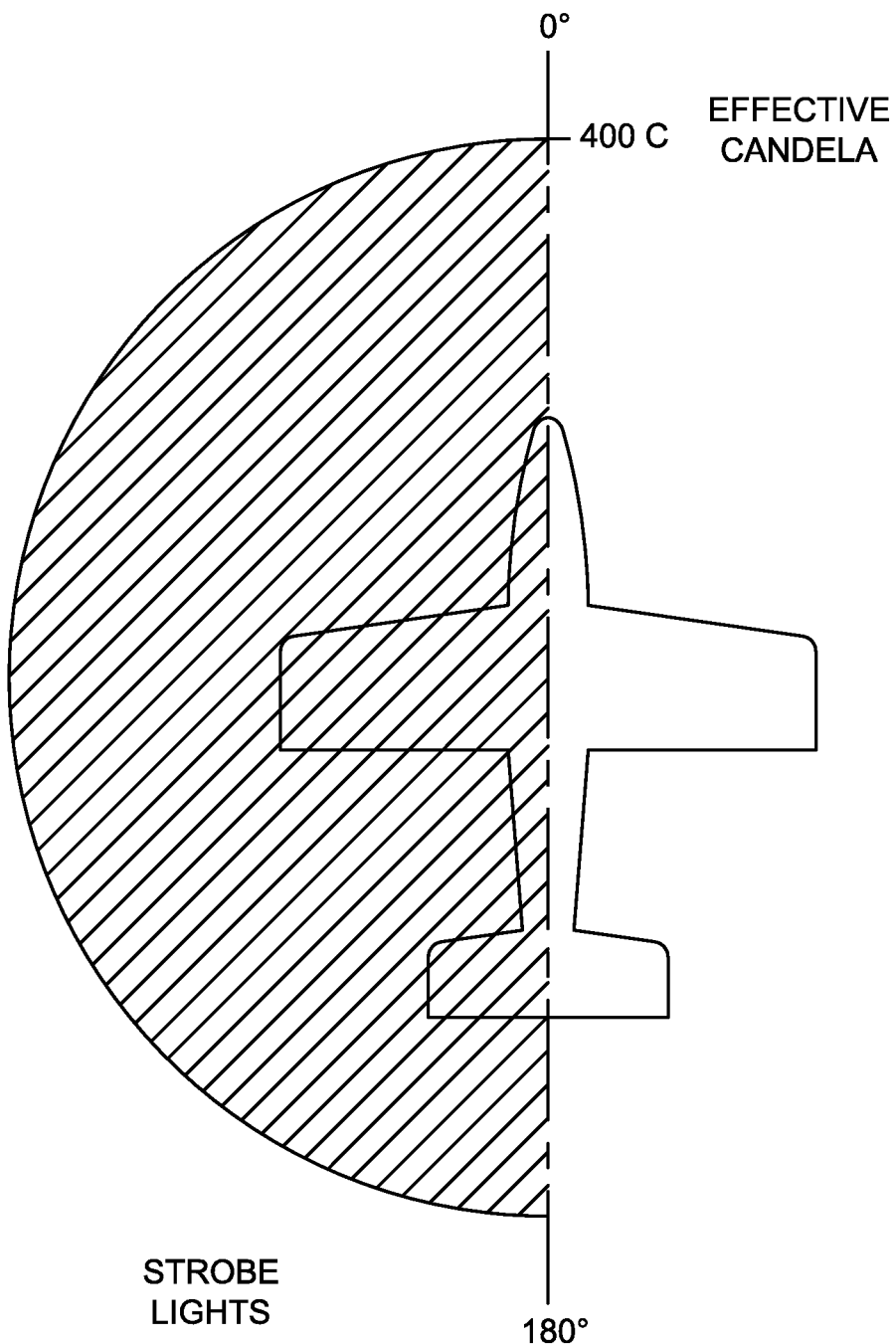
FIG. 1B is a pictorial summary of the light pattern required for strobe lights relative to the aircraft.

FIG. 1B shows a pictorial summary of the light pattern required for the strobe lights relative to the aircraft. The major axis of the aircraft runs from 0 degrees to 180 degrees, nose to tail. The pattern of FIG. 1B is in the horizontal plane. The strobe lights must be visible from 0 degrees to 180 degrees. The luminous intensity of the strobe lights is a minimum of 400 effective candela from 0 to 180 degrees. The effective candela is defined by national aviation standards and depends upon luminous intensity, duration and period of the strobe. National aviation illumination standards are well known to those skilled in the art.

Figure 1C:
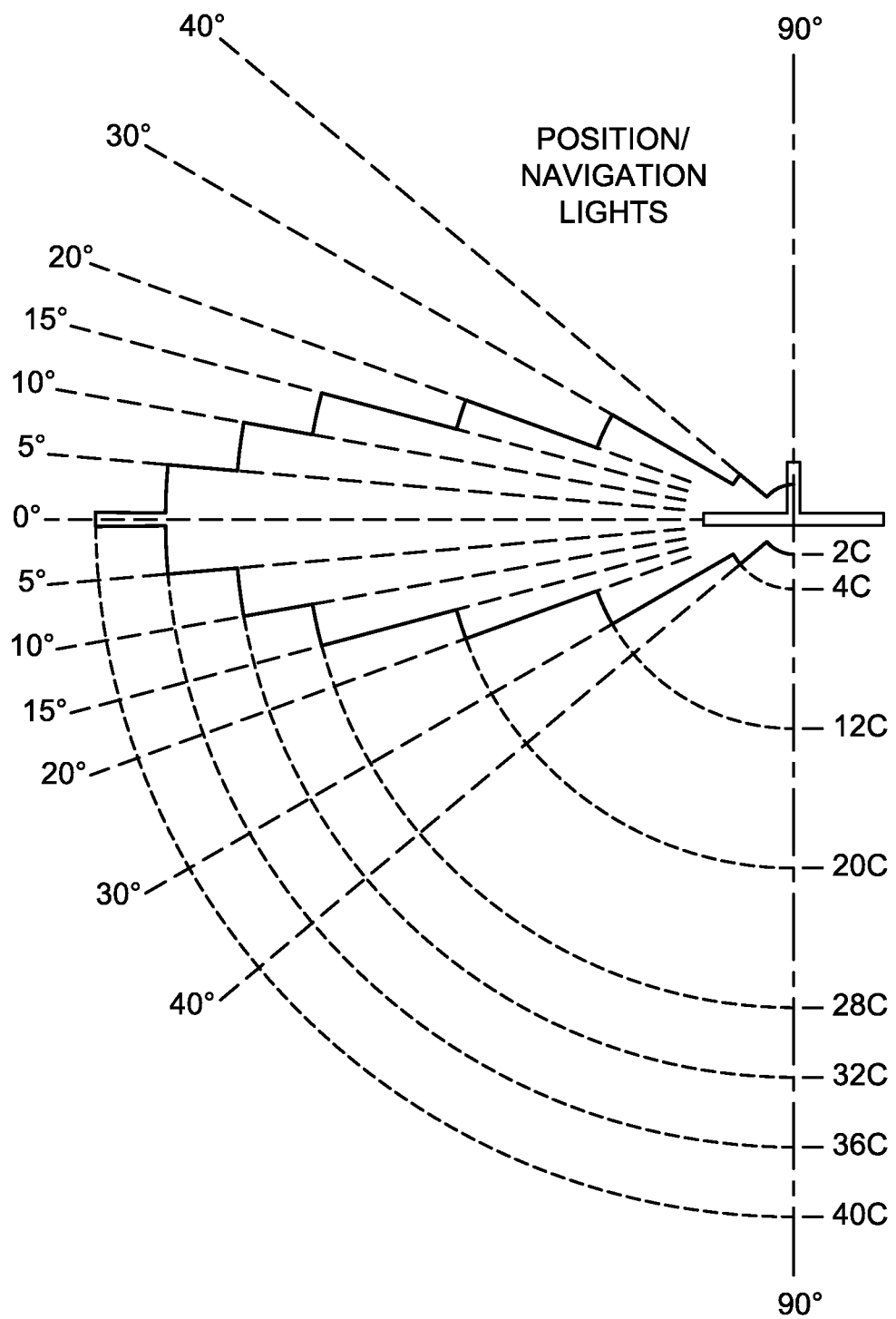
FIG. 1C is a pictorial summary of the vertical light pattern required for colored navigation lights and white position lights relative to the aircraft.

FIG. 1C shows a pictorial summary of the light pattern required for colored navigation and white position lights relative to the aircraft. The pattern of FIG. 1C is in a vertical plane passing through the aircraft navigation light. The vertical plane is further perpendicular to the major axis of the aircraft. The luminous intensity of the colored navigation lights and position lights are a minimum of 40 candela in the horizontal plane of the aircraft at 0 degrees, 36 candela from 0 to 5 degrees, 32 candela from 5 to 10 degrees, 28 candela from 10 to 15 degrees, 20 candela from 15 to 20 degrees, 12 candela from 20 to 30 degrees, 4 candela from 30 to 40 degrees, and 2 candela from 40 to 90 degrees. FIG. 1C shows the requirements for the left or port side of the aircraft. The requirements for the right or starboard side of the aircraft are the same and have been omitted for clarity.

Figure 1D:
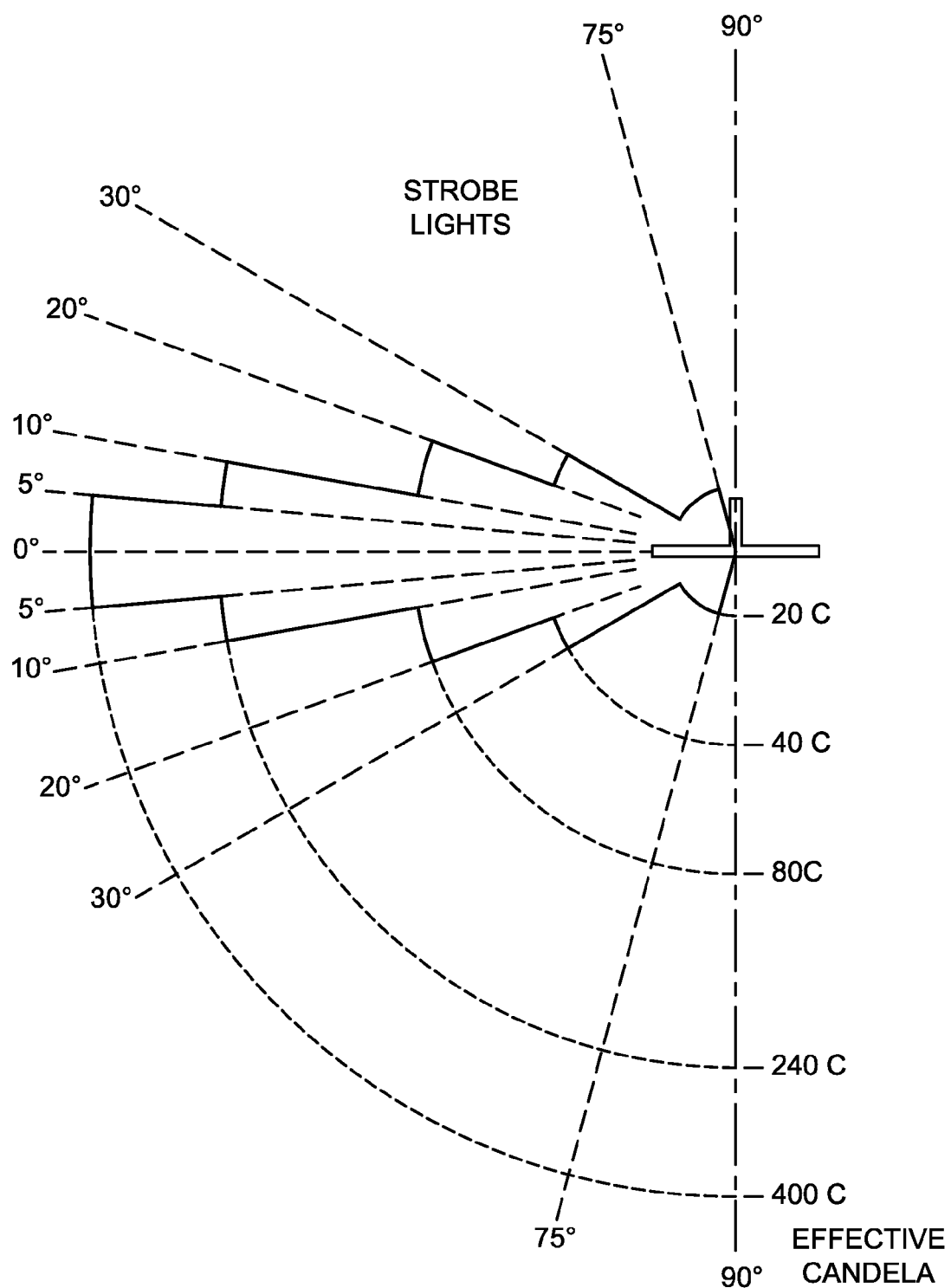
FIG. 1D is a pictorial summary of the vertical light pattern required for strobe lights relative to the aircraft.

FIG. 1D shows a pictorial summary of the light pattern required for strobe lights relative to the aircraft. The pattern of FIG. 1D is in a vertical plane containing the aircraft strobe light. The vertical plane is further perpendicular to the major axis of the aircraft. The luminous intensity of the strobes lights is a minimum of 400 effective candela from 0 to 5 degrees, 240 effective candela from 5 to 10 degrees, 80 effective candela from 10 to 20 degrees, 40 effective candela from 20 to 30 degrees, and 20 effective candela from 30 to 75 degrees. FIG. 1D shows the requirements for the left or port side of the aircraft. The requirements for the right or starboard side of the aircraft are the same and have been omitted for clarity.

Figure 1E:
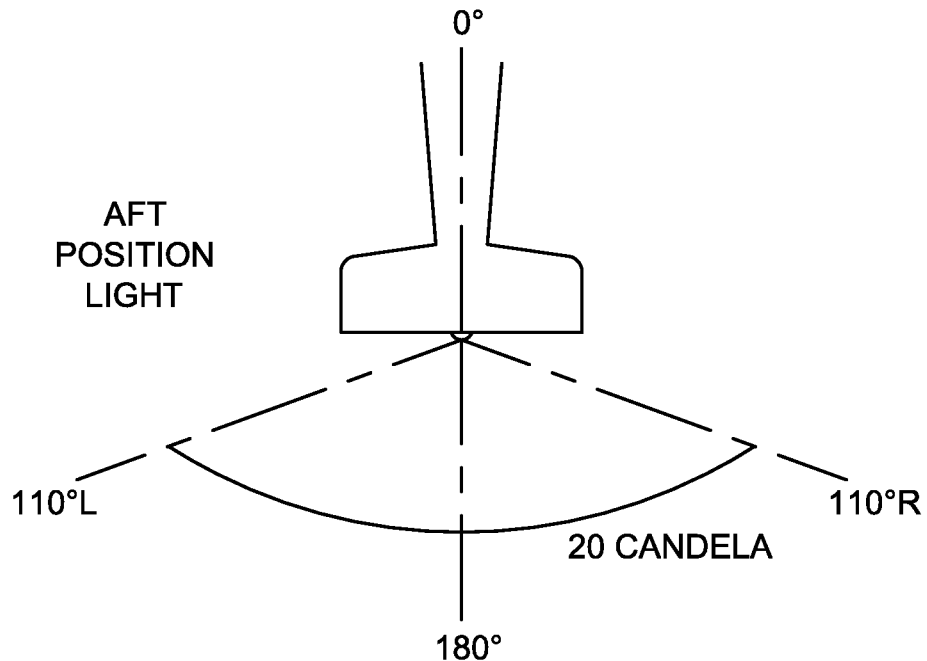
FIG. 1E is a pictorial summary of the light pattern required for a white aft position light relative to the aircraft.

FIG. 1E shows a pictorial summary of the light pattern required for a white aft position light relative to the aircraft. The major axis of the aircraft runs from 0 degrees to 180 degrees, nose to tail. The pattern of FIG. 1E is in the horizontal plane. The luminous intensity of the white aft position light is 20 candela from 110 to 180 degrees both to the right and left (starboard and port) sides of the aft position light.

Figure 1F:
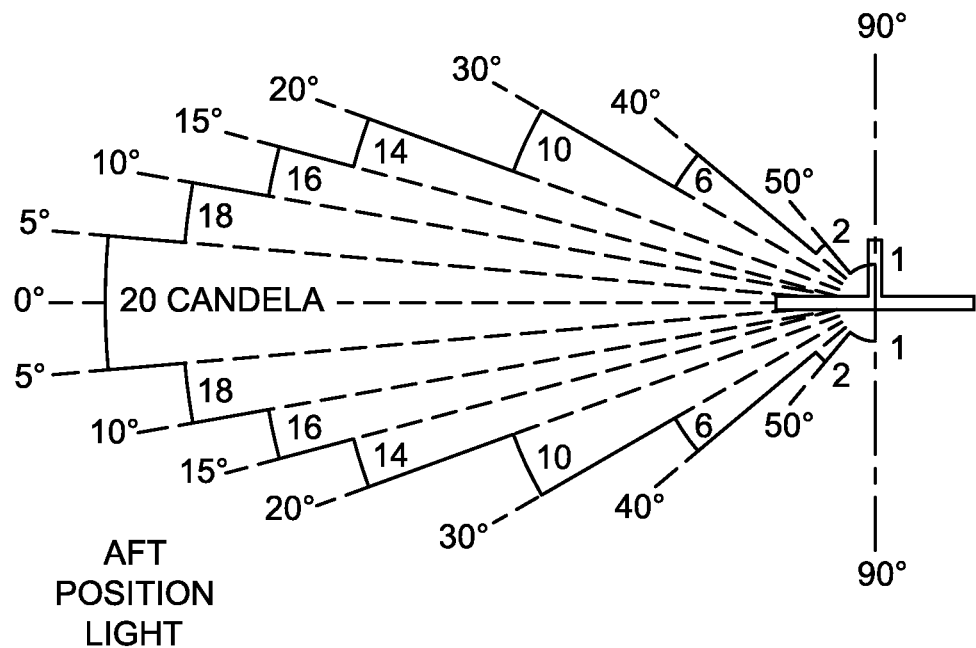
FIG. 1F is a pictorial summary of the vertical light pattern required for a white aft position light relative to the aircraft.

FIG. 1F shows a pictorial summary of the light pattern required for a white aft position light relative to the aircraft. The pattern of FIG. 1F is in a vertical plane passing through the aft position light. The vertical plane is further perpendicular to the major axis of the aircraft. The luminous intensity of the aft position light is a minimum of 20 candela from 0 to 5 degrees, 18 candela from 5 to 10 degrees, 16 candela from 10 to 15 degrees, 14 candela from 15 to 20 degrees, 10 candela from 20 to 30 degrees, 6 candela from 30 to 40 degrees, 2 candela from 40 to 50 degrees, and 1 candela from 50 to 90 degrees, both above and below the horizontal plane of the aircraft. FIG. 1F shows the requirements for the left or port side of the aircraft. The requirements for the right or starboard side of the aircraft are the same and have been omitted for clarity.

Figure 1G:
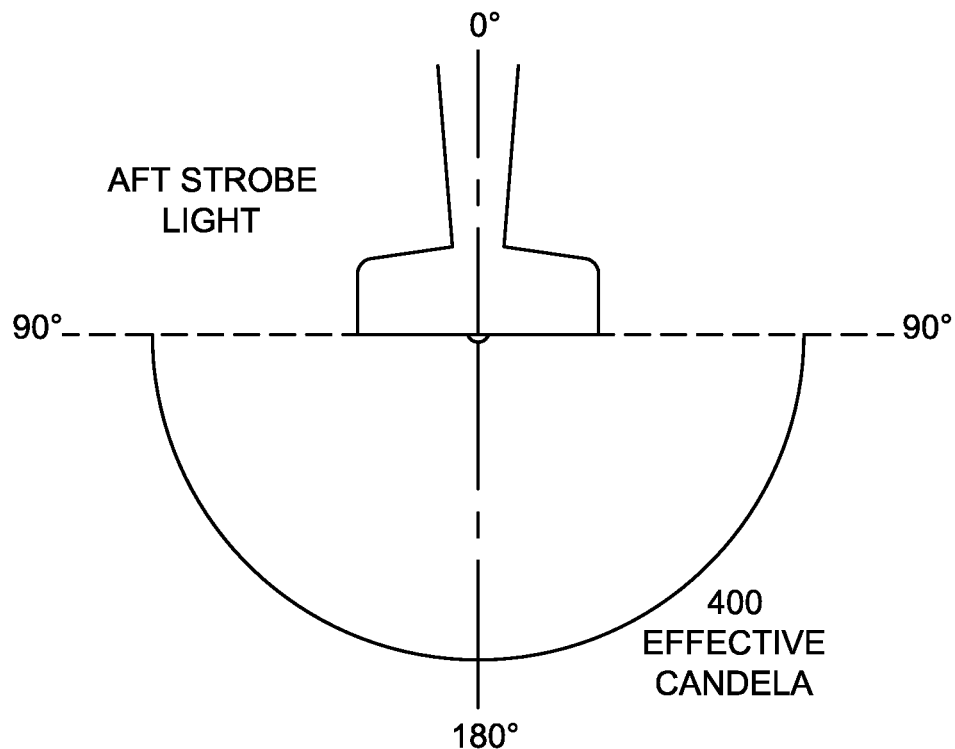
FIG. 1G is a pictorial summary of the light pattern required for an aft strobe light relative to the aircraft.

FIG. 1G shows a pictorial summary of the light pattern required for a white aft strobe light relative to the aircraft. The major axis of the aircraft runs from 0 degrees to 180 degrees, nose to tail. The pattern of FIG. 1G is in the horizontal plane. The luminous intensity of the white aft position light is 400 effective candela from 90 to 180 degrees both to the right and left (starboard and port) sides of the aft position light.

Figure 1H:
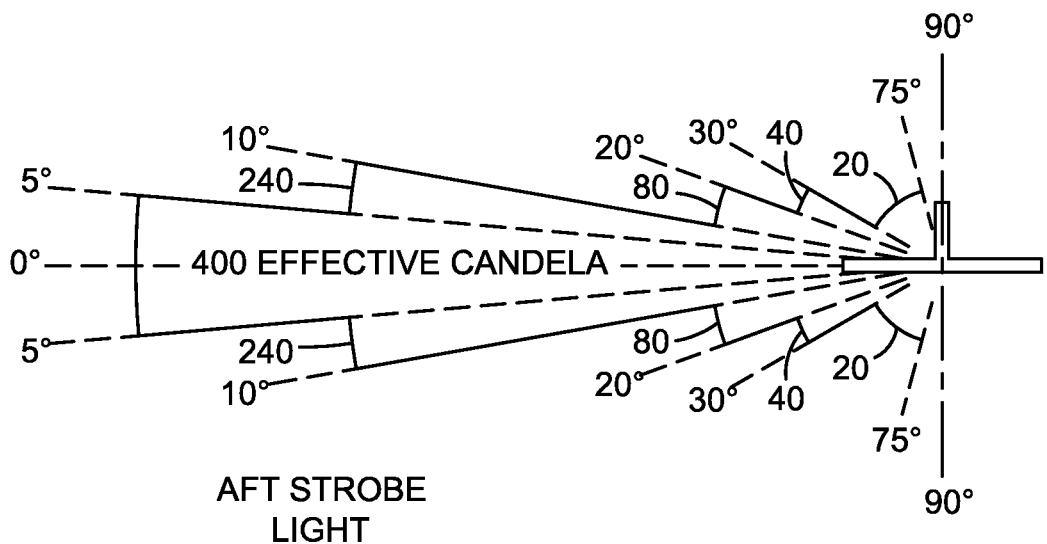
FIG. 1H is a pictorial summary of the vertical light pattern required for an aft strobe light relative to the aircraft.

FIG. 1H shows a pictorial summary of the light pattern required for a white aft strobe light relative to the aircraft. The pattern of FIG. 1H is in a vertical plane passing through the aft position light. The vertical plane is further perpendicular to the major axis of the aircraft. The luminous intensity of the aft strobe light is a minimum of 400 effective candela from 0 to 5 degrees, 240 effective candela from 5 to 10 degrees, 80 effective candela from 10 to 20 degrees, 40 effective candela from 20 to 30 degrees, and 20 effective candela from 30 to 75 degrees, both above and below the horizontal plane of the aircraft. FIG. 1H shows the requirements for the left or port side of the aircraft. The requirements for the right or starboard side of the aircraft are the same and have been omitted for clarity.

Figure 2:
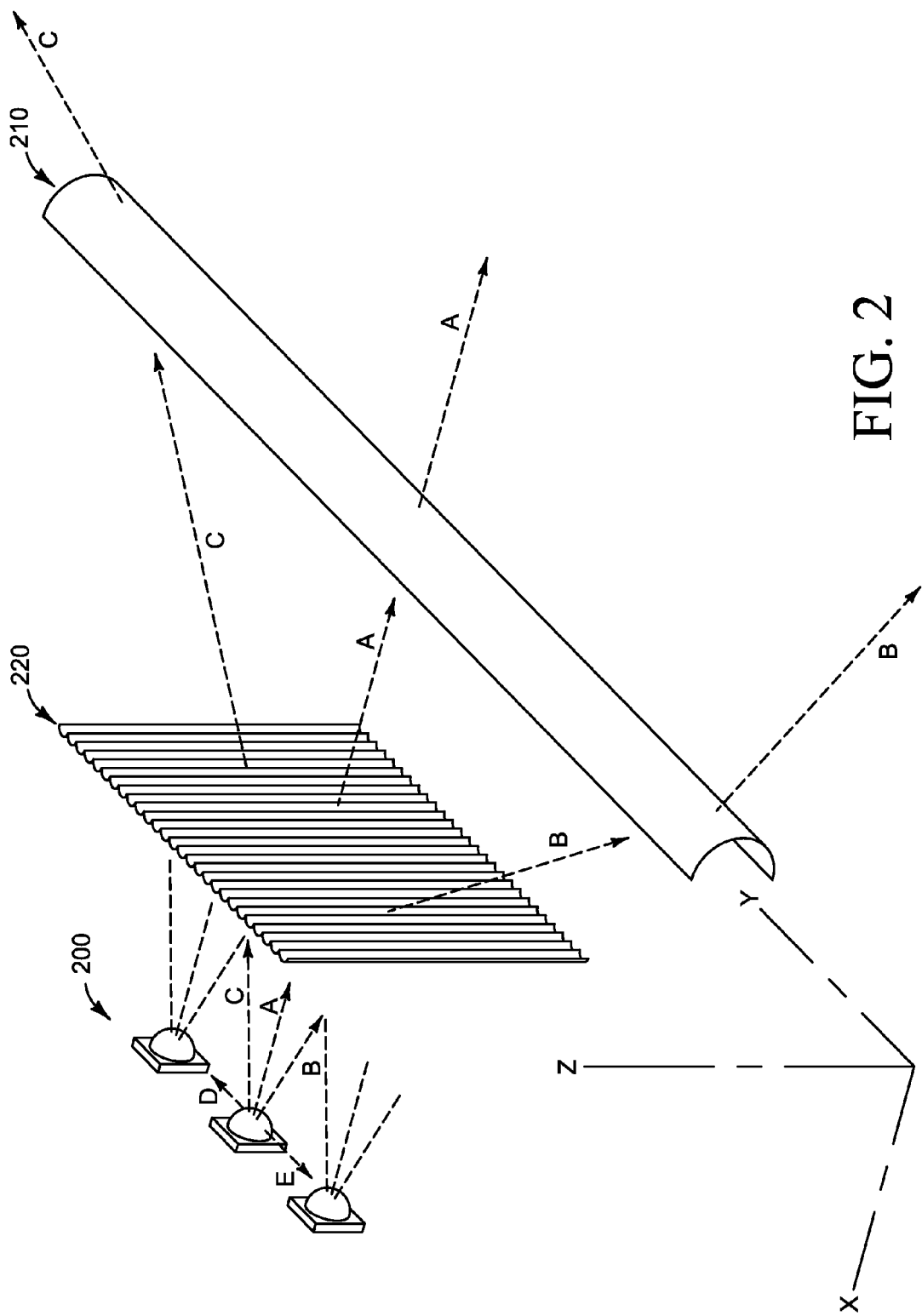
FIG. 2 is an exemplary light path in one embodiment of the aircraft external lighting system.

FIG. 2 shows an exemplary light path in one embodiment of the aircraft external lighting system. One or more light sources 200 emit light in a substantially lambertian radiation pattern. A lenticular lens 220 parallel to the Y-Z plane further spreads the light. A cylindrical lens 210 then refocuses the light substantially in the X-Y plane although light above and below the X-Y plane is also emitted. Light rays A, B and C show exemplary paths as the light is dispersed from a light source 200, spread by the lenticular lens 220 and focused by the cylindrical lens 210. Ray A is parallel to the X-Y plane while ray B falls away from the X-Y plane and ray C rises above the X-Y plane. The major longitudinal axis of the cylindrical lens 210 is parallel to the Y axis. The major longitudinal axis of the lenticular lens 220 is parallel to the Z axis. Thus, the two major longitudinal axes of the cylindrical and lenticular lenses are substantially orthogonal to each other. Both axes are also approximately orthogonal to the path of the ray A. Viewed in another way, the lenticular lens spreads the rays A, B and C along the Y axis while the cylindrical lens focuses the rays A, B and C along the Z axis.

The lenticular lens 220 in FIG. 2 is simplified for clarity. In practice, the lenticular lens is a planar array of lenses with their major axis parallel. Further in practice, the array making up the array does not need to be planar, but may be curved as depicted in figures to follow. In a similar manner, cylindrical lens 210 while depicted as straight in FIG. 2 is curved in practice as depicted in figures to follow. This arrangement of orthogonal curved lenses enable the aircraft external lighting system to place light where desired as indicated by FIGS. 1A-1H. The lens arrangement also reduces wasted light which is aimed in undesired directions or aimed in directions which already have adequate illumination.

A lambertian radiation pattern is a description of the brightness profile of a light source as it is viewed from side to side. If ray A is the major axis of a light source 200, the light emitted from light source 200 is brightest when viewed along ray A toward the light source 200. As the viewer moves away from the major axis toward rays D and E the brightness decreases. In a perfect lambertian radiation pattern, the major axis is 0 degrees and increases to 90 degrees along rays D and E. Mathematically, a lambertian radiation pattern is expressed as L*cos(theta) where L is the maximum brightness or luminous intensity viewed along ray A and theta is the angle which increases from 0 degrees along ray A to 90 degrees along rays D or E. Thus a light source with a lambertian radiation pattern emits the brightest light along ray A and nearly no light along rays D or E.

Figure 3:
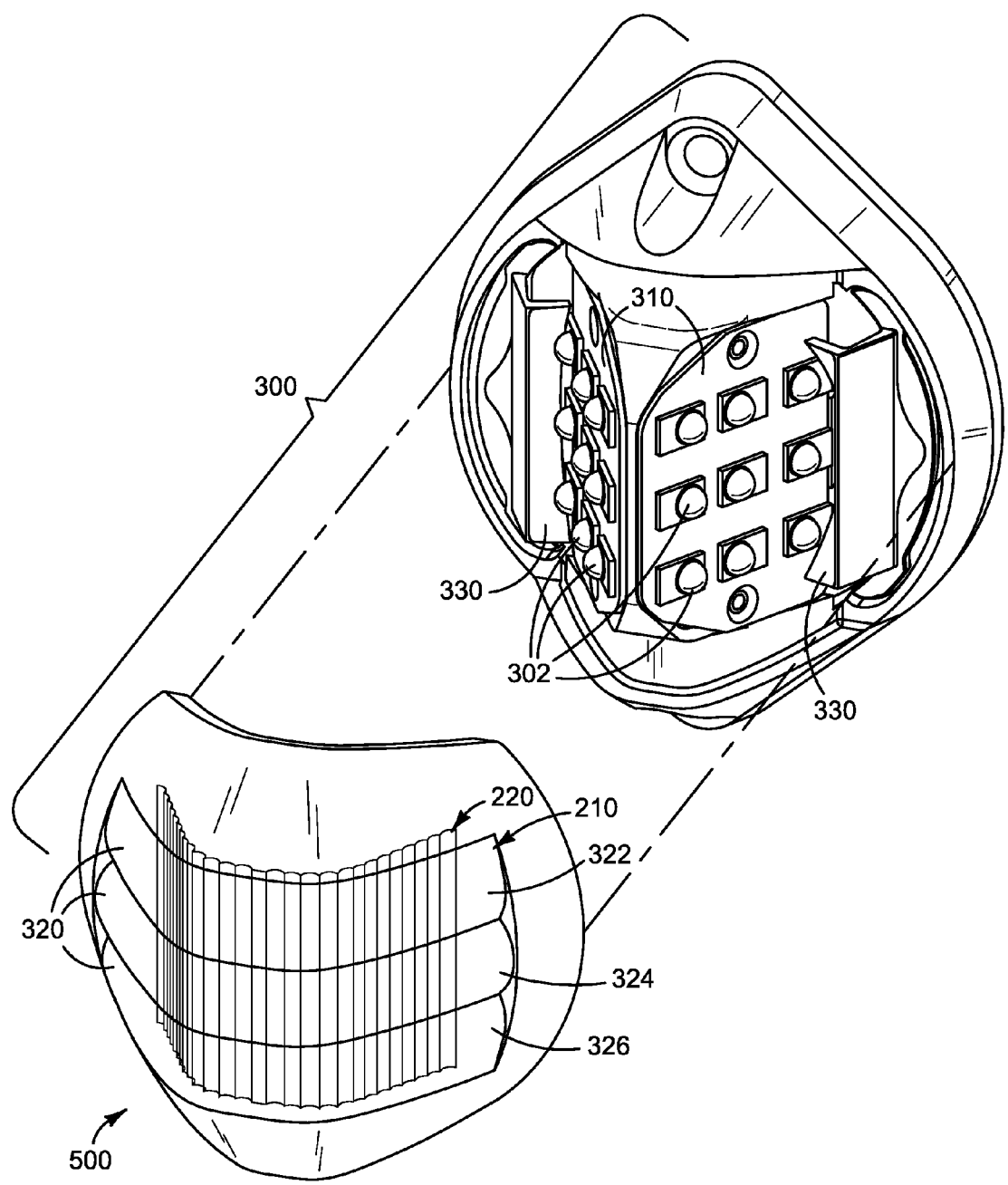
FIG. 3 is a partially exploded view of one embodiment of the aircraft external lighting system.

FIG. 3 is a partially exploded view of one embodiment of the aircraft external lighting system 300. Two planar arrays 310 of LEDs 302 act as the light source. The lens assembly 500 has multiple cylindrical lenses 320 individually identified as cylindrical lenses 322, 324, 326. Note that in FIG. 3, the cylindrical lenses 322, 324, 326 are curved. This curvature is determined by the desired emission pattern of light. The major axis of the cylindrical lens of FIG. 2 is now curved in FIG. 3. The cylindrical lenses 322, 324, 326 each lie in a plane parallel to the X-Y plane of FIG. 2. The planes associated with each of the cylindrical lenses 322, 324, 326 are still substantially orthogonal to the major axis of the lenticular lens 220. The lenticular lens 220 of FIG. 2 is depicted as a series of lenticular lenses which follow the curve of the cylindrical lenses 320. The opposing face of the lens assembly has the lenticular lens 220. In FIG. 3 the lenticular lens 220 is viewed by looking through the lens assembly 500 and the multiple cylindrical lenses 320. Reflectors 330 reflect light from the LEDs 302 back into the lens assembly 500. This light which would normally be wasted is reflected back into the lens assembly 500 where it is redirected by internal reflection to desired directions.

Figure 4C:
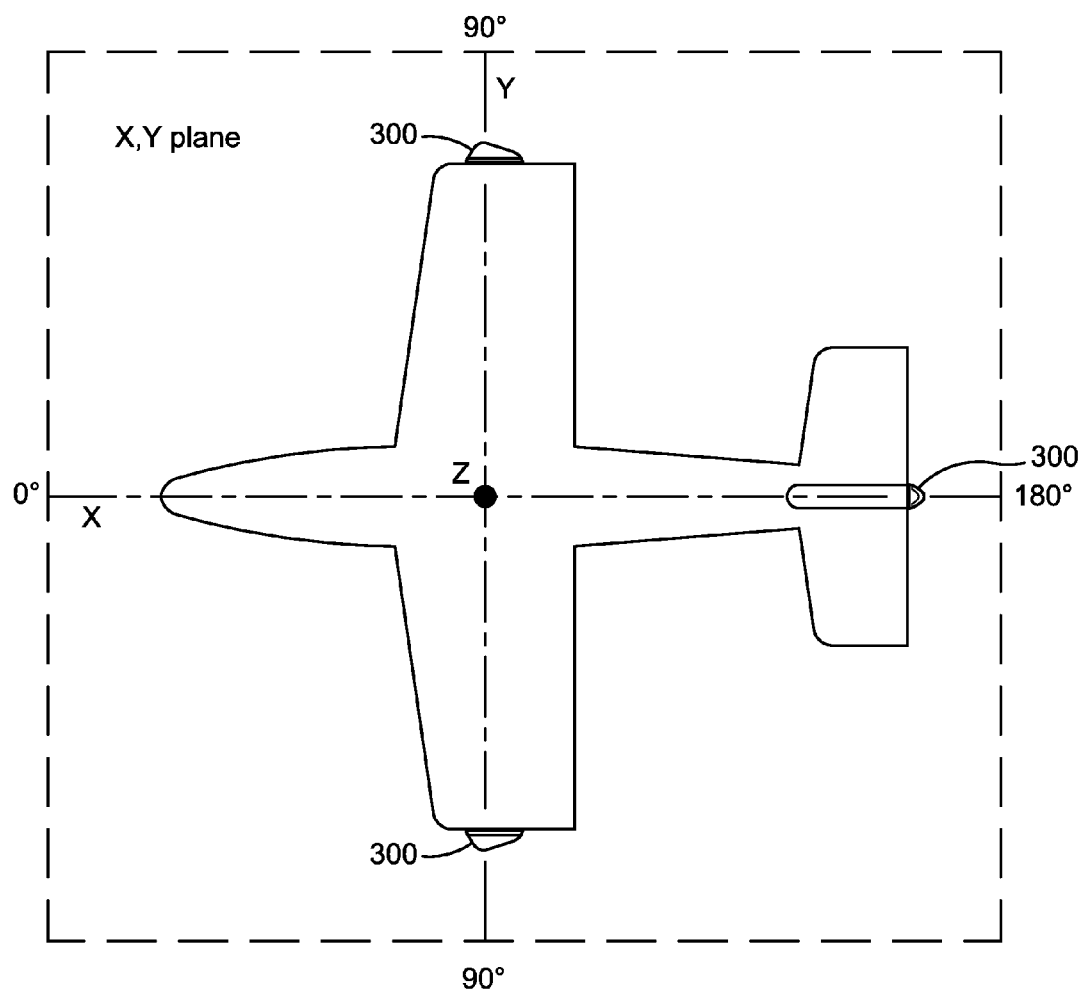
FIG. 4 show embodiments of the aircraft external lighting system as they might appear on an aircraft wing and tail.
Figure 5A:
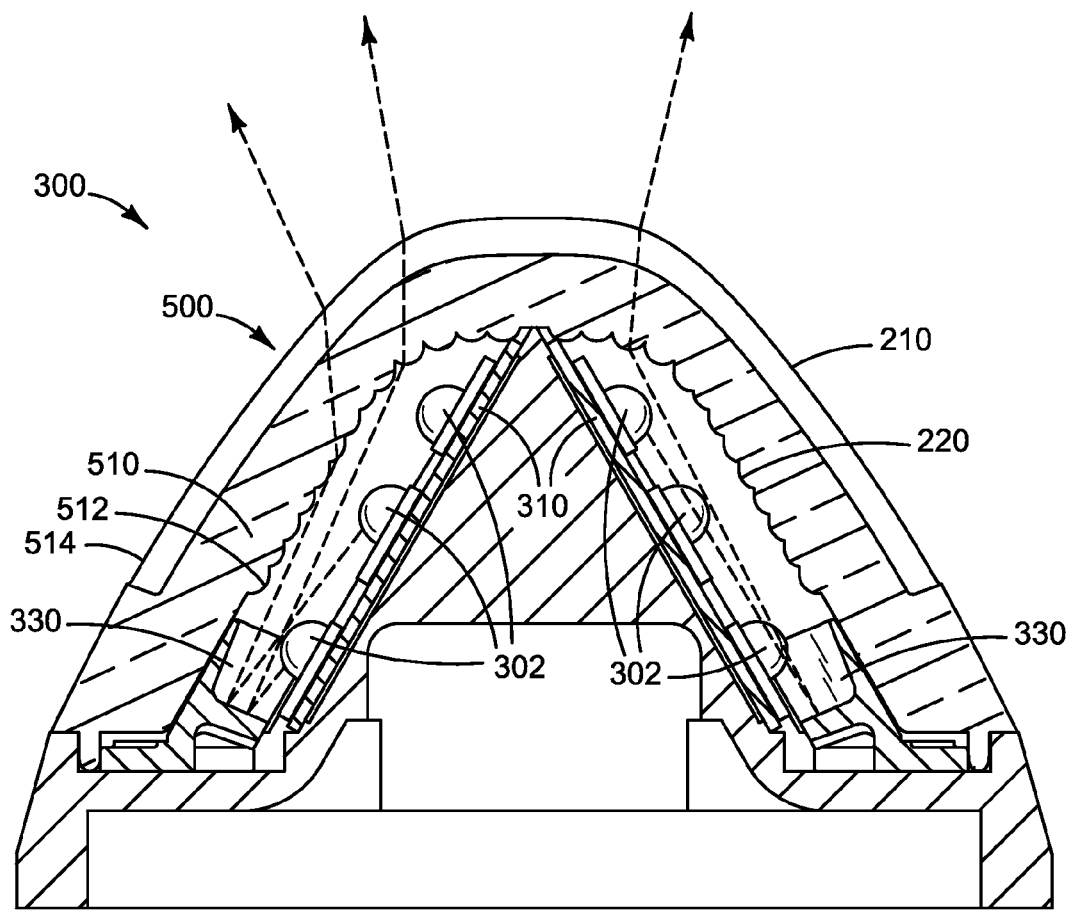
FIG. 5A is a sectional view of one embodiment of the aircraft external lighting system.

FIG. 4C shows embodiments of the aircraft external lighting system 300 as they might appear on aircraft wings and tail. In FIGS. 4A and 4B the planes of the curved multiple cylindrical lenses 320 are aligned or substantially parallel to the major horizontal plane of the aircraft depicted as the X-Y plane. In FIG. 4A the X-Y plane cuts a section through the aircraft external lighting system 300 midway along the Z axis. FIG. 5A shows this section of the aircraft external lighting system 300. The X-Y plane of FIGS. 4A and 4B is also called the major plane of the aircraft as described for FIGS. 1A, 1B, 1E, and 1G. FIG. 4C shows an aft position/strobe light embodiment of the aircraft external light system 300 on tail of the aircraft and also a navigation/position/strobe embodiment of the aircraft external navigation lighting system 300 on the wing tips.

FIG. 5A shows the lens assembly 500 of the aircraft external lighting system 300 of FIG. 4A in cross section. The lens material 510 can be any number of materials suitable for optical lenses. Example materials are polycarbonate and glass. Other materials known to those skilled in the art are also possible. The cylindrical lens 210 and the lenticular lens 220 are formed on opposing faces of the same material 510. The cylindrical lens 210 is formed on one face 514 of the lens material 510, while the lenticular lens 220 is formed on an opposing face 512. LED arrays 310 with multiple LEDs 302 direct light first through the lenticular lens 220 and then the cylindrical lens 210. Light from the LEDs 302 which would normally be directed in undesired directions, that is not through the lens assembly 500 is reflected back into the lens assembly 500 by reflectors 330. This reflected light is then redirected by internal reflection within the lens assembly 500 to desired directions and exits through the cylindrical lens 210. While only a single cylindrical lens 210 is visible in FIG. 5A, multiple cylindrical lenses 320 as shown in FIG. 3 are possible.

FIG. 5A also shows an example of how the reflectors 330 of FIGS. 3 and 5A redirect otherwise wasted light back into the lens assembly 500. As seen in FIG. 5A light emitted from the side of LED 302 is reflected by the reflector 330 back into the lens assembly 500. Example light rays are depicted with dashed lines. The light, directed by internal reflection within the lens assembly 500 eventually exits the lens assembly 500 through the cylindrical lens 210. This feature allows the aircraft external lighting system 300 to meet the aviation standards such as those of FIG. 1A-1H with less energy dissipation. This results in less energy consumption from the aircraft electrical system and results in cooler operation of the aircraft external lighting system 300 itself. Cooler operation increases reliability and longevity of the 300 and its components. Cooler operation and reduced number of LEDs or other light sources also enables more compact packaging of the aircraft external lighting system 300. Compact designs further increase the number of aircraft types available to use the aircraft external lighting system 300 and reduces aerodynamic drag of the aircraft in flight.

Figure 5B:
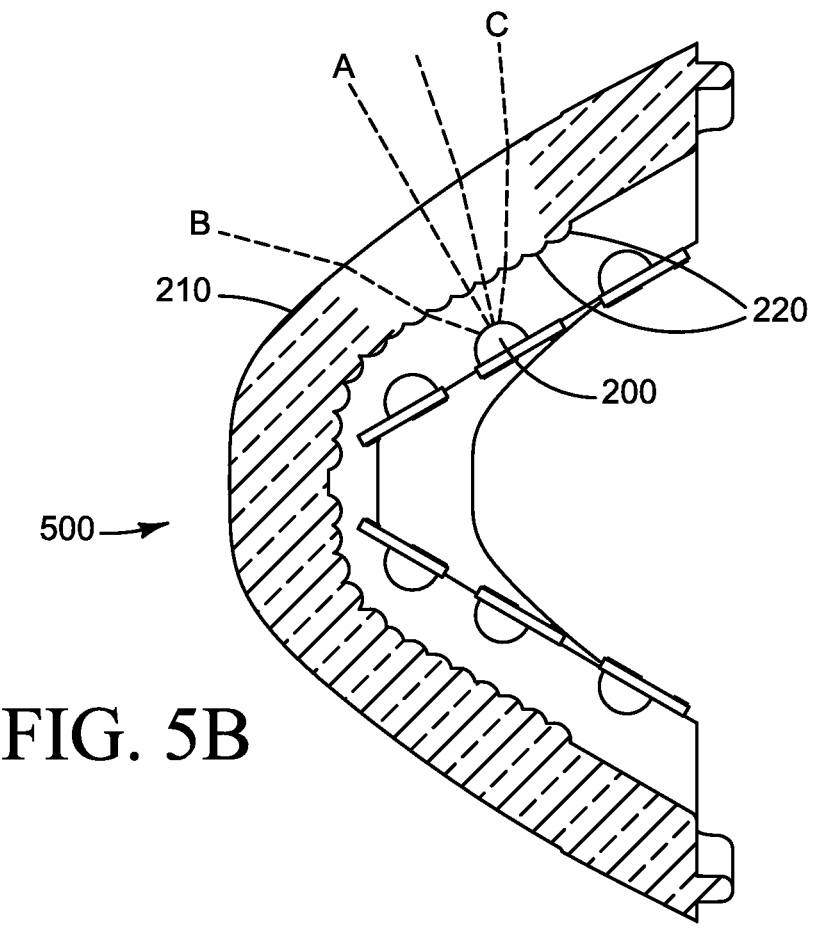
FIG. 5 B is a sectional view of one embodiment of the aircraft external lighting system.

FIG. 5B shows another sectional view of the lens assembly 500 of the aircraft external lighting system 300 of FIG. 4A. In FIG. 5B the light source 200 directs light rays A, B and C through the curved lenticular lens 220 and cylindrical lens 210. The lenticular lens 220 acts to spread the light emitted from the source 200.

Figure 5C:
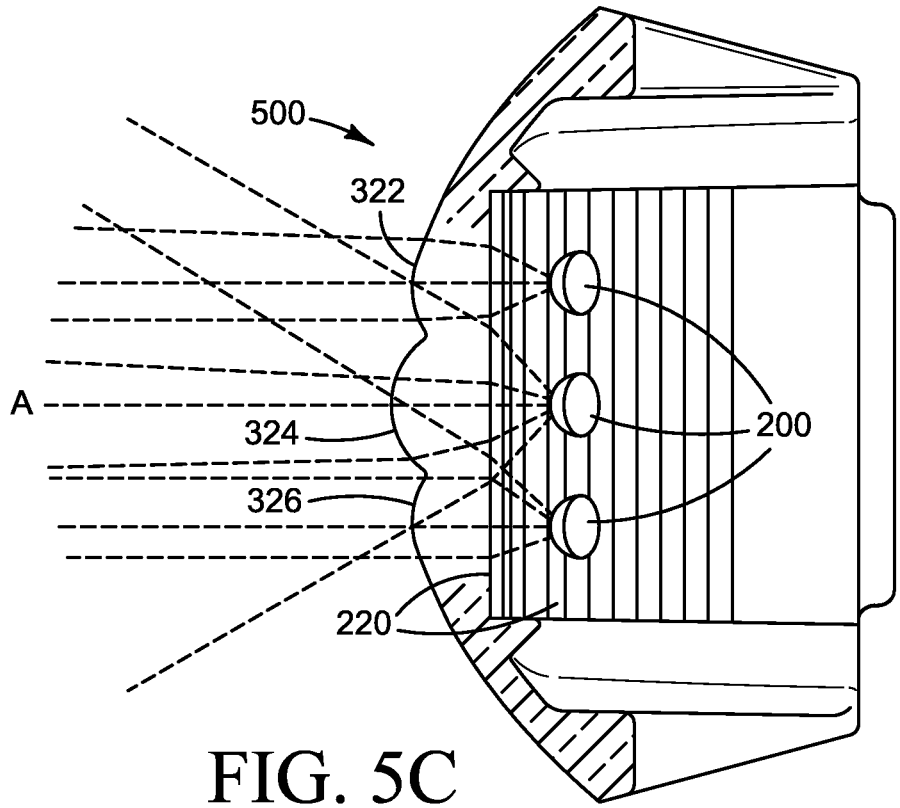

FIG. 5C shows another sectional view of the lens assembly 500 of the aircraft external lighting system 300 of FIG. 4A. This sectional view shows the three cylindrical lenses 322, 324, and 326 in cross section. A portion of the lenticular lens 220 is also visible. Light ray A is visible while ray B is rising up out of the plane of FIG. 5C and ray C is descending down out from the plane of FIG. 5C. The cylindrical lenses 322, 324 and 326 act to focus the light in desired directions.

FIG. 6 is a frontal view of one embodiment of the aircraft external lighting system 300. This embodiment is an aft position light which is typically mounted on the tail or rear portion of the aircraft fuselage. The multiple cylindrical lenses 320 are individually identified as cylindrical lenses 322, 324, and 326. The internal rows of LEDs 312, 314, 316 are visible by looking through the cylindrical lenses 320. These LEDs are located on two planar arrays 310. Note that in this embodiment, each of the three rows of LEDs 312, 314, and 316 is aligned behind a respective cylindrical lens 322, 324, and 326.

FIG. 7 is a side view of the aircraft external lighting system embodiment 300 of FIG. 6. In FIG. 7 only one of the planar arrays of LEDs 310 is visible through the lens assembly 500. Again, in this embodiment, note how each of cylindrical lenses 322, 324 and 326 is aligned in front of a portion of the plurality of LEDs 312, 314 and 316. In both FIGS. 6 and 7 the reflectors 330 of FIG. 5A have been omitted for clarity.

FIG. 8 is a flow chart of one embodiment of the aircraft external lighting method 900. The method 900 begins at 910. Block 920 disperses the light emitted from a light source. One example of this dispersion is via LEDs which emit light in a substantially lambertian radiation pattern. Block 930 spreads the emitted light in a first axis to form a more uniform pattern. The intent is to reduce hot spots, areas of more than enough light, and to reduce dark spots, areas of inadequate light. The use of a lenticular lens is one way to accomplish this light spreading. Block 940 focuses the light along a second axis substantially orthogonal to the first axis in a plurality of desired directions. The use of one or more cylindrical lenses is one way to accomplish this light spreading. Block 950 reflects light from directions not desired and redirects the light in one or more of the desired directions. The use of reflectors on the edge of the lens to reflect the light back into the lens is one way to accomplish this redirection. Additionally, the light can be redirected in the lens itself by using internal reflection.

Although this invention has been described in terms of certain preferred embodiments, other embodiments that are apparent to those of ordinary skill in the art, including embodiments that do not provide all of the features and advantages set forth herein, are also within the scope of this invention. Rather, the scope of the present invention is defined only by reference to the appended claims and equivalents thereof.

The invention claimed is:

1. An aircraft external lighting system to indicate the aircraft presence to an external observer, the lighting system comprising:
    a light source emitting light, the light source adapted to mount externally on the aircraft, the light source comprising a plurality of planar arrays of light emitting diodes (LEDs);
at least two of the plurality of planar arrays of LEDs oriented at greater than 45 degrees to each other;
    a lenticular lens adapted to spread the light emitted from the light source along a first axis; and
    a plurality of cylindrical lenses, each of the plurality of cylindrical lenses having a curved major longitudinal axis oriented parallel to the horizontal plane of the aircraft, the plurality of cylindrical lenses adapted to focus the light from the lenticular lens along a second axis in a plurality of desired directions; wherein the desired directions encompass an angle greater than 69 degrees, light from the plurality of cylindrical lenses directly reaching the external observer without interruption of reflection.

2. The aircraft external lighting system of claim 1 wherein each LED emits light in a substantially lambertian radiation pattern.

3. The aircraft external lighting system of claim 1 wherein the lenticular lens is oriented substantially orthogonal to the major longitudinal axis of the plurality of cylindrical lenses.

4. The aircraft external lighting system of claim 1 wherein the lenticular lens and the plurality of cylindrical lenses are formed on the same material.

5. The aircraft external lighting system of claim 1 wherein the lenticular lens and the plurality of cylindrical lenses are formed on opposing faces of the same material.

6. The aircraft external lighting system of claim 1 further comprising reflectors to reflect light emitted from non-desired directions into the lenticular lens or the plurality of cylindrical lenses where the light is guided via total internal reflection.

7. The aircraft external lighting system of claim 1 wherein each of the plurality of cylindrical lenses is aligned in front of a portion of the plurality of LEDs.

8. The aircraft external lighting system of claim 1 wherein the plurality of desired directions include a 180 degree arc in the horizontal plane of the aircraft.

9. A method for directing the light from an aircraft external lighting system, to indicate aircraft presence to an observer external to the aircraft, the method comprising:

dispersing the light emitted from a plurality of planar arrays of light emitting diodes (LEDs) outside of the aircraft, over an angle greater than 90 degrees;

spreading the light with a lenticular lens along a first axis;

focusing the light with a plurality of cylindrical lenses along a second axis substantially orthogonal to the first axis in a plurality of desired directions, wherein each of the plurality of cylindrical lenses has a curved major longitudinal axis oriented parallel to the horizontal plane of the aircraft, and wherein the plurality of desired directions exceeds 90 degrees in the horizontal plane of the aircraft and wherein the light along the second axis reaches the observer without the interruption of reflection.

10. The method of claim 9 wherein each LED emits light in a substantially lambertian radiation pattern.

11. The method of claim 9 further comprising reflecting light from directions not desired and redirecting the light in one or more of the desired directions.

12. The method for directing the light from an aircraft external lighting system of claim 9 wherein the plurality of desired directions include a 180 degree arc in the horizontal plane of the aircraft.

13. An aircraft external lighting system to indicate the aircraft presence to an external observer, the lighting system comprising:

a light source emitting light, the light source adapted to mount externally on the aircraft, the light source comprising a plurality of planar arrays, each planar array further comprising a plurality of light emitting diodes (LEDs);

at least two of the plurality of the planar arrays of LEDs oriented at greater than 45 degrees to each other;

a plurality of cylindrical lenses adjacent the light source, each of the plurality of cylindrical lenses having a curved major longitudinal axis oriented parallel to the horizontal plane of the aircraft each cylindrical lens directing the light from the LEDs in a desired direction; and a lenticular lens between the light source and the plurality cylindrical lenses, the lenticular lens oriented substantially orthogonal to the cylindrical lenses wherein the desired directions encompass an angle greater than 90 degrees in the horizontal plane of the aircraft, the light from the plurality of cylindrical lenses directly reaching the external observer without interruption of reflection.

14. The aircraft external lighting system of claim 13 wherein the lenticular lens and the plurality of cylindrical lenses are formed on opposing sides of a lens material.

15. The aircraft external lighting system of claim 13 further comprising reflectors for reflecting light emitted in directions not desired and redirecting the light into the lenticular lens or the plurality of cylindrical lenses.

16. The aircraft external lighting system of claim 13 wherein each cylindrical lens is aligned with a portion of the plurality of LEDs.

17. The aircraft external lighting system of claim 13 wherein the plurality of desired directions include a 180 degree arc in the horizontal plane of the aircraft.

* * * * *